United States Patent [19]

Goo et al.

[11] Patent Number: 4,559,615
[45] Date of Patent: Dec. 17, 1985

[54] METHOD AND APPARATUS FOR ENCODING, STORING AND ACCESSING CHARACTERS OF A CHINESE CHARACTER-BASED LANGUAGE

[76] Inventors: Atkin Y. Goo, 1496 Molehu Dr., Honolulu, Hi. 96818; Gee-In Goo, 300 Quaint Acres Dr., Silver Spring, Md. 20904

[21] Appl. No.: 418,461

[22] Filed: Sep. 15, 1982

[51] Int. Cl.[4] .............................. G06F 3/02; B41J 5/00
[52] U.S. Cl. ..................................... 364/900; 364/518; 364/418; 400/110; 178/30; 340/731
[58] Field of Search .................. 364/900, 518, 200; 382/56; 400/484, 110, 109, 485, 486, 104; 340/365, 728, 731, 748, 711, 751; 354/13; 365/127

[56] References Cited

U.S. PATENT DOCUMENTS

| | | | |
|---|---|---|---|
| 3,665,450 | 5/1972 | Leban | 340/731 |
| 3,936,664 | 2/1976 | Sato . | |
| 4,079,482 | 3/1978 | Yeh | 400/104 |
| 4,122,533 | 10/1978 | Kubinak . | |
| 4,144,405 | 3/1979 | Wakamatsu . | |
| 4,163,229 | 7/1979 | Bodin et al. . | |
| 4,173,753 | 11/1979 | Chou | 382/56 |
| 4,181,973 | 1/1980 | Tseng | 364/900 |
| 4,193,119 | 3/1980 | Arase et al. . | |
| 4,228,507 | 10/1980 | Leban . | |
| 4,251,871 | 2/1981 | Yu | 364/518 |
| 4,270,022 | 5/1981 | Loh | 400/110 |
| 4,286,329 | 8/1981 | Goertzel et al. | 364/900 |
| 4,294,550 | 10/1981 | Wang | 365/127 |
| 4,327,421 | 4/1982 | Wang | 364/900 |
| 4,408,199 | 10/1983 | White et al. | 400/110 |
| 4,498,143 | 2/1985 | Strzelecki | 364/900 |

OTHER PUBLICATIONS

Lexis Operator's Manual, Mead Data Central 1980.

*Primary Examiner*—Eddie P. Chan
*Attorney, Agent, or Firm*—Finnegan, Henderson, Farabow, Garrett & Dunner

[57] ABSTRACT

A complex character generator having a mass memory for storing the individual characters of a Chinese character-based language in pictorial form, the characters being represented by a two-part code, the first part defining a predetermined element common to a plurality of characters, and the second part defining the balance of the individual character. The character generator includes a keyboard having one section of keys for singularly entering a unique 2-digit code representing each of the predetermined common elements, and a numerical section for entering at least a 5-digit code defining the balance of the characters under a modified Four Corner Coding Method. A method for coding Chinese characters into the two-part code and the complete Four Corner Coding Method are also disclosed.

12 Claims, 15 Drawing Figures

FLOW DIAGRAM

FIGURE 5

PRIOR ART

TABLE IA - FOUR CORNER CODING METHOD    RULE 1. WRITING STROKE FORMS

| NUMERICAL CODE | NAME OF STROKE | STROKE FORM | EXAMPLE OF CHARACTERS INCLUDING STROKE FORM | DESCRIPTIONS |
|---|---|---|---|---|
| 0 | 头 HEAD | 亠 | 言主广疒 | Formed by a single dot and a horizontal stroke. |
| 1 | 横 HORIZONTAL | 一乚 | 天 圭 地 江 元 凤 | Horizontal stroke, or upstanding stroke with right-bending hook. |
| 2 | 垂 VERTICAL | 丨丿 | 山 月 千 则 | Vertical stroke, or upstanding stroke with left-bending hook. |
| 3 | 点 DOT | 丶 | 宀 礻 冖 厶 之 衣 | Dot or slash. |
| 4 | 叉 CROSS | 十乂 | 草 杏 皮 刈 犬 对 | Two crossing strokes. |
| 5 | 插 PIERCING STROKE | 扌 | 扌 戈 申 史 | One stroke pierces through two or more horizontal strokes. |
| 6 | 方 SQUARE | 口 | 国 鸣 目 四 甲 由 | Square. |
| 7 | 角 CORNER | 𠃍 厂 亅 乚 丿 ㄱ | 羽 門 灰 阴 雪 衣 冤 罕 | Corner formed with horizontal and vertical strokes. |
| 8 | 八 EIGHT | 八 丷 人 𠆢 | 分 頁 羊 余 灾 泰 足 午 | The Chinese "eight" or its modified forms. |
| 9 | 小 SMALL | 小 ⺌ 屮 个 卜 | 尖 糸 粦 暴 惟 | The Chinese character "small" or its modified forms. |

Codes 1, 2, and 3 are single stroke forms while codes 0, 4, 5, 6, 7, 8, and 9 are two or more (complex) stroke forms. Whenever possible, complex stroke forms are selected over single stroke forms, i.e. 亠 is coded as 0 and not 3; 扌 is coded as 4 and not 2; 厂 is coded as 7 and not 2; ⋎ is coded as 8 and not 3 or 2; and 小 is coded as 9 and not 3.

TABLE IB - FOUR CORNER CODING METHOD       PRIOR ART

CODING CHARACTERS BY WRITING STROKE FORMS

*Rule 2*   Each word is coded by the stroke forms at the four corners of the characters in the following order: upper left, upper right, lower left and lower right corner as diagrammed below:

(1) upper left   (2) upper right
(3) lower left   (4) lower right

Examples

顏=0128   戳=4325   洛=1786

*Rule 3*   When the top or the bottom of the character has only one stroke form the stroke form is assumed to be in the left corner while the right corner assumes the code of "0".

Examples

宣 直 首 冬 票 宗 母

Similarly, if a single stroke form includes two corners, the first comes in the coding sequence will receive the stroke form code and the other corner will be encoded "0".

Examples

干 之 持 邦 大 卅 車 射

*Rule 4*   For characters with stroke forms 口 , 門 , 門 , and 行 , the 3rd and 4th corners are selected from the strokes within.

Examples

囚=6043   閉=7724   閲=7721   衡=2143

However, if stroke(s) are to the right, left, top, or bottom of them, the regular rule of encoding applies.

Examples

菌=4450   潤=3712   蔣=4422

TABLE IC (Sheet 1) - <u>FOUR CORNER CODING METHOD</u>    PRIOR ART
  <u>SUPPLEMENTAL GUIDES</u>

GUIDE 1.   The stroke form of each character is based on the commonly used manual script form.

EXAMPLES:  Correct 
           Wrong 

GUIDE 2.   In selecting stroke forms:

a. The characters with  and , wherein there is a dot over a horizontal stroke, the code should be "3" if there are other strokes connected to right or left and not "0".

b. For characters with ,  and  stroke forms, wherein the outside corners tend to be square, the code should be "7" and not "6".

c. For a corner stroke form which extends between two or more corners, i.e. "" the correct code is 1702 and not just 7.

d. For the  stroke form which crosses with other stroke forms, i.e.  the correct code is xx43 and not xx80.

e. Stroke forms such as ,  wherein there are two strokes in the center and ,  wherein there are two strokes at the side are not designated as code 9.

GUIDE 3.   In selecting stroke forms for corners:

a. Regardless of top or bottom, the rightmost and the leftmost horizontal or singular stroke form should be selected.

Examples:

b. If there are other stroke forms above or below the farthest right and/or farthest left stroke form, as shown in the following examples, the upper or lower stroke form should be selected.

Examples:

c. When there are two selectable stroke forms at the corners, select the highest stroke form for the upper corners and the lowest stroke from for the lower corners.

Examples:

d. If there are other stroke forms below strokes that are right or left bending such as 丿 or 乀 as shown in the examples, the other stroke form TABLE IC (Sheet 2) - <u>FOUR CORNER CODING METHOD</u>     PRIOR ART <u>SUPPLEMENTAL GUIDES</u> should be selected as corners.

Examples: 春 奎 碎 衣 辟 石 e. If a slanted stroke form is located at the upper left corner, it should be selected as the left corner. However, if the slanted stroke is located in the upper right corner, the upper right corner will be used.

Examples: 勾 鉤 俥 鳴

GUIDE 4.  When redundancy (two or more characters with the same four corner code) exists, select the nearest and obvious unused stroke form above the lower right corner stroke as a sub-corner. If that stroke form has been used, the code for the sub-corner is "0".

EXAMPLES: 若=44710 元 拼 是 疝 欣 畜 傀 獛 逢 毽 禧 繕 蠻 軍 覽 功 郭 疫 瘟 愁 金 逮 仁 見

In the event that two characters have the same four corner code and sub-corner code, the characters are indexed according to the number of actual horizontal strokes. For example, the characters 市 and 帝 have the same four corner and sub-corner codes, 00227. However, the character 市 has two horizontal lines while the character 帝 has three horizontal lines. Therefore, the character 市 is indexed before the character 帝.

TABLE II

TABLE OF PREDETERMINED COMMON ELEMENTS

ARRANGED IN TRADITIONAL ORDER

"零零" 部 (00) NON-RADICAL

TABLE III

TABLE OF PREDETERMINED COMMON ELEMENTS

| 00 零 | 01 一 | 02 广 | 03 水 | 04 十 | 05 手 | 06 口 | 07 乙 | 08 疒 | 09 方 |
|---|---|---|---|---|---|---|---|---|---|
| 10 二 | 11 玉 | 12 弓 | 13 豕 | 14 耳 | 15 瓦 | 16 石 | 17 刀 | 18 頁 | 19 雨 |
| 20 隹 | 21 鹿 | 22 人 | 23 夕 | 24 阜 | 25 牛 | 26 白 | 27 勹 | 28 欠 | 29 糸 |
| 30 辵 | 31 冫 | 32 戶 | 33 心 | 34 寸 | 35 广 | 36 西 | 37 宀 | 38 穴 | 39 示 |
| 40 女 | 41 土 | 42 彳 | 43 大 | 44 艸 | 45 草 | 46 酉 | 47 力 | 48 走 | 49 木 |
| 50 儿 | 51  | 52 豸 | 53 戈 | 54 虫 | 55 卩 | 56 車 | 57 子 | 58 立 | 59 歹 |
| 60 囗 | 61 日 | 62 目 | 63  | 64 田 | 65 衣 | 66 网 | 67 邑 | 68 貝 | 69 足 |
| 70 冂 | 71 匚 | 72 月 | 73 犬 | 74 及 | 75 馬 | 76 斤 | 77 門 | 78 皿 | 79 尸 |
| 80 八 | 81 金 | 82 巾 | 83 食 | 84 攴 | 85 羊 | 86 言 | 87 气 | 88 竹 | 89 禾 |
| 90 羽 | 91 几 | 92 角 | 93 臼 | 94 舟 | 95 鳥 | 96 魚 | 97 山 | 98 火 | 99 米 |

TABLE IV

| Incorporating Radical | Traditional Radicals Incorporated |
|---|---|
| 匚 | 匚 , 匸 |
| 土 | 土 , 士 * |
| 广 | 广 , 麻 |
| 人 | 人 , 入 * |
| 攵 | 攵 , 文 * , 欠 |
| 日 | 日 , 曰 * |
| 月 | 月 , 肉 * , 月 |
| 臼 | 臼 , 鼠 |

* However the conventional radicals 士 , 文 , 入 , 曰 , and 肉 are also individual characters and therefore, these individual characters have been assigned the non-radical group and encoded as 00-401000, 00-00400, 00-80000, 00-60100, and 00-40227, respectively..

TABLE V

REPRESENTATIVE CHINESE CHARACTERS HAVING ASSIGNED CODE NUMBERS

| Four Corner Code | Character (word) | GOO Code |
|---|---|---|
| 0040 | 享 | 57-00600 |
| 1771 | 己 | 07-17170 |
| 1771 | 已 | 07-17770 |
| 1771 | 巳 | 07-60000 |
| 7771 | 巴 | 07-60200 |
| 4010 | 士 | 00-40100 |
| 4022 | 肉 | 00-40227 |

TABLE VI

| Character (word) | radical part | code of radical part | remaining part of character | code of remaining part | machine code of character |
|---|---|---|---|---|---|
| 四 | 囗 | 60 | 八 | 22010 | 60-22010 |
| 号 | 口 | 06 | 丂 | 10207 | 06-10207 |
| 碼 | 石 | 16 | 馬 | 71327 | 16-71327 |
| 新 | 斤 | 76 | 亲 | 00904 | 76-00904 |
| 詞 | 言 | 86 | 司 | 17620 | 86-17620 |
| 角 | 角 | 92 | NONE | 00000 | 92-00000 |

TABLE VII

| Character (word) | radical part | code of radical part | remaining part of character | code of remaining part | code of the character |
|---|---|---|---|---|---|
| 音 | NONE | 00 | 音 | 00601 | 00-00601 |
| 豆 | NONE | 00 | 豆 | 10108 | 00-10108 |
| 干 | NONE | 00 | 干 | 10400 | 00-10400 |
| 行 | NONE | 00 | 行 | 21221 | 00-21221 |
| 父 | NONE | 00 | 父 | 80400 | 00-80400 |

TABLE VIII

| Character (word) | radical part | code of radical part | remaining part of character | code of remaining part | number of strokes in remaining part | code of character |
|---|---|---|---|---|---|---|
| 訪 | 言 | 86 | 方 | 00227 | 4 | 86-002274 |
| 譎 | 言 | 86 | 啇 | 00227 | 11 | 86-002271 |
| 疫 | 疒 | 08 | 殳 | 77407 | 4 | 08-774074 |
| 瘦 | 疒 | 08 | 叟 | 77407 | 9 | 08-774079 |
| 倍 | 人 | 22 | 音 | 00601 | 8 | 22-006018 |
| 信 | 人 | 22 | 言 | 00601 | 7 | 22-006017 |

METHOD AND APPARATUS FOR ENCODING, STORING AND ACCESSING CHARACTERS OF A CHINESE CHARACTER-BASED LANGUAGE

BACKGROUND OF THE INVENTION

This invention relates generally to methods and apparatus for encoding languages for machine processing and more specifically to methods and apparatus for converting characters of the Chinese, Japanese and Korean languages, i.e., characters of a Chinese character-based language, into a numeric code, pictorially storing the characters according to the code, and accessing the characters for processing.

Coding Chinese characters for the purpose of efficient retrieval began about 300 years ago with Chinese Emperor Kang-Hsi, who directed his scholars to develop an indexing method for Chinese characters. This effort resulted in the development of the Radical Coding (Notation) Method, which is still widely used by publishers of dictionaries as to Chinese character-based languages. The primary drawback of this method is that it is a non-numerical coding system, that is, the characters are classified by forms, called radicals, common to a plurality of characters, and the total number of strokes of each character. Many individuals have attempted to convert the Radical Coding Method to a digitalized process, but, to date, only limited success has been reported.

At the turn of the 20th century a new coding method, known as the Four Corner Coding (Notation) Method, was developed by Mr. Wang, Yun-Wu. This coding method divides all the stroke forms used in drawing the characters into ten categories and assigns a numerical coding from 0 to 9 to each of the categories. Then, for each character, the stroke forms at each of the four corners and a sub-corner are encoded into individual numerical values depending on the stroke forms. Thus, a five digit code is generated for each character. This is the current alternative indexing method for characters used in Chinese dictionaries. However, this method does not uniquely encode each of the characters, so that many ambiguities exist in this coding scheme. An ambiguity, as used herein, exists when two or more characters are contained in the same numerical code number. Since the invention of the Four Corner Coding Method, many attempts have been made to improve the method.

SHORT STATEMENT OF THE INVENTION

A principal object of this invention, therefore, is to improve and expand present methods of converting Chinese characters into a numeric code with capacity to encode all the individual Chinese, Japanese and Korean characters in a specific and unique numeric identification for each character.

Another object of the present invention is to provide a system for converting all characters of a Chinese character-based language into a unified numeric code, utilizable by present basic computerized apparatus for communications, optical display, printing, etc.

Still another object of the invention is to provide a coding system for the characters of Chinese character-based languages which can be readily learned and used by persons having minimum knowledge of the specific language involved.

A further object of the invention is to provide a complex character generator utilizing the method of the invention, including mass pictorial memory storage and a keyboard for fast and efficient access of the pictorial memory storage.

These and other objects have been accomplished by the comprehensive system of the invention for translating a character of a Chinese character-based language into a numeric code comprising the steps of identifying in the characters a defined element, if any, common to a plurality of characters, assigning to the identified defined element a 2-digit code number individual to the defined element, and assigning to any character not including such a defined common element, a unique 2-digit code number defining such characters as a group; excluding the identified element from a character containing such a defined common element for purpose of analysis and treating the balance of the character as an individual character; analyzing the balance of the character from which said identified defined common element has been excluded, or the entire character if no defined common element appears in the character, as an individual character by the Four Corner Coding Method, assigning to each such analyzed character an individual 5-digit code number under the Four Corner Coding Method; and consolidating the 2-digit code number and the 5-digit code number into a 7-digit code number.

The objects of the invention are also accomplished by a complex character generator comprising memory means for pictorially storing individual characters, each represented by a two-part numerical code, the first part defining one of a plurality of predetermined elements, if any, common to a plurality of characters or the absence of such a predetermined element and the second part defining the balance of the individual character; and means for accessing the stored characters, the accessing means including means for entering the first part of the numerical code and then for entering the second part of the numerical code.

The accessing means includes a keyboard having a first section for entering a 2-digit code unique to individual ones of the predetermined elements common to a plurality of characters and a second section for entering the second part of the individual code.

Preferably, the first section of the keyboard includes keys each bearing the likeness of an individual predetermined common element to be entered by the key, and the second section includes numerical keys, including a unique key for entering the 2-digit code indicating the absence of a predetermined element common to a plurality of characters.

The accompanying tables and drawings which are incorporated in and constitute a part of the description of the invention, together with the main body of the description, serve to explain the principles of the invention.

BRIEF DESCRIPTION OF THE TABLES AND DRAWINGS

TABLE IA tabulates Rule 1 for identifying writing stroke forms under the traditional Four Corner Coding Method;

TABLE IB depicts Rules 2-4 for coding characters by writing strokes forms under the traditional Four Corner Coding Method;

TABLE IC (Sheets 1 and 2) depicts guides for interpreting Rules 1-4 of TABLES IA and IB;

TABLE II shows the code numbers, under the method of the invention, for predetermined radicals of Chinese characters arranged in traditional order;

TABLE III shows the codes and radicals of TABLE II arranged in code number order;

TABLE IV depicts traditional radicals incorporated into other radicals under the method of invention;

TABLE V tabulates representative Chinese characters receiving specially assigned code numbers under the method of the invention;

TABLE VI shows examples of coding of characters including one of the predetermined radicals;

TABLE VII shows examples of coding of characters not including one of the predetermined radicals;

TABLE VIII shows examples of 8-digit coding of characters wherein the 7-digit code of the invention results in ambiguity;

FIG. 5 is a plan view of of an example of radical keys showing predetermined radicals for use in the keyboard of FIG. 2.

DETAILED DESCRIPTION OF THE PREFERRED EMBODIMENTS

Figure 1:
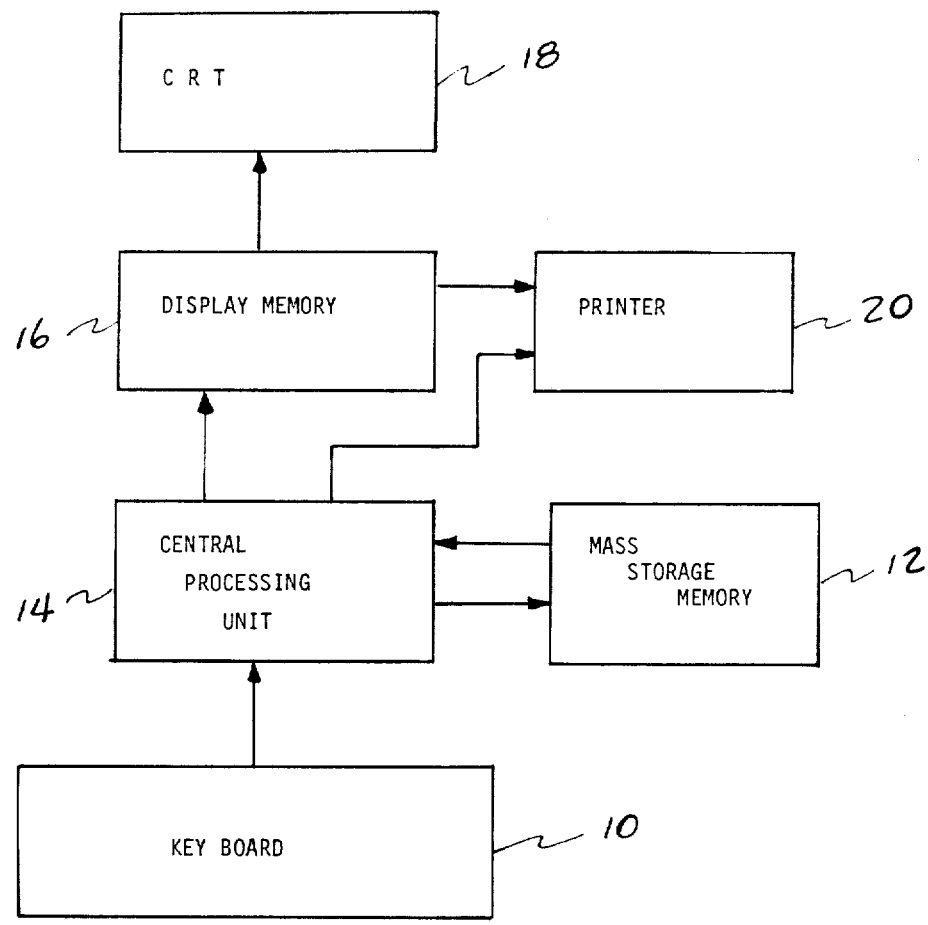
FIG. 1 is a diagram of the character generator system of the invention, in which the keyboard of the invention can be incorporated.

In the traditional systems for evaluating, translating, or encoding a character of the Chinese, Japanese or Korean languages, (hereinafter referred to as Chinese character-based languages), one of two methods was employed, as stated previously.

Under the method developed by the scholars of Emperor Kang-Hsi, the radical portion of the character, if any, common to a plurality of characters, was first identified. The 214 recognized radicals had fixed, defined conceptual meanings and were identified by number from a table. The total number of strokes in the character was then counted. Many dictionaries for translating Chinese-based characters into English, for example, use a variant of this system wherein all the characters to be defined are arranged in groups by the total number of strokes and within these groups the characters are organized with reference to the radical, if any, in the character.

It is self-apparent that this method has many ambiguities after the identification of the radical and cannot, in and of itself, be used for definitive numerical coding.

The Four Corner Coding Method is much more sophisticated than the Radical Method. Under the conventional Four Corner Method, the characters are identified under a set of rules as to the stroke forms at the four corners of the character and at one sub-corner of the character. These rules are as follows, as translated from a current Chinese-to-Chinese dictionary.

Rule 1. The writing stroke forms of the Chinese characters are classified into ten (10) groups. These groups are coded from 0 to 9 as listed in TABLE IA, wherein Group 0 (head) includes characters having a single dot and a generally horizontal stroke; Group 1 (horizontal) includes characters having a horizontal stroke, or an upstanding stroke with a right-bending lower hook; Group 2 (vertical) includes characters having a vertical stroke, or an upstanding stroke with a left-bending lower hook; Group 3 (dot) includes characters having a dot or a slash; Group 4 (cross) includes characters having two crossing strokes; Group 5 (piercing stroke) includes characters wherein one stroke pierces through two or more strokes; Group 6 (square) includes characters having a square or a rectangle; Group 7 (corner) includes characters having a corner formed with horizontal and vertical strokes; Group 8 (eight) includes characters having therein the Chinese character "eight", or its modified forms; and Group 9 (small) includes characters having therein the Chinese character "small" or its modified forms.

In coding the writing stroke forms, the more complex stroke form is used if there is a choice between simpler and more complex stroke form coding.

Rule 2. The first four digits of the 5-digit code of the Four Corner Method are developed by identifying the writing stroke forms, according to Rule 1, at the four corners of the character in succession, upper left, upper right, lower left and lower right, as illustrated in TABLE IB, Rule 2.

Rule 3. When the top or the bottom of the character has only one stroke form, the stroke form is assumed to be in the left corner, while the right corner assumes the code "0". On the other hand, if a single stroke form includes two corners, the first corner in the sequence will receive the stroke form code and the other corner will be encoded "0", as illustrated in TABLE IB, Rule 3.

Rule 4. If the stroke forms effectively form an enclosure, the first and second corners are encoded with the stroke forms of the enclosure, and the third and fourth corners are encoded with the stroke forms within the enclosure. However if there are other stroke forms outside the enclosure, the regular rules of encoding apply, as shown in TABLE IB–Rule 4.

In applying the four rules of the conventional Four Corner Coding Method, there are four conventional guides, illustrated in TABLE IC (Sheets 1 and 2) for achieving uniformity in coding, which are as follows:

Guide 1. The stroke form of each character is based on the commonly used manual script form.

Guide 2.
(a) In characters having a dot over a horizontal stroke (generally code "0"), the stroke form "3" should be used if there are other strokes connected to the right or left.
(b) For characters wherein the corners tend to be square but the square is not closed, the code should be "7" and not "6".
(c) For characters including a corner stroke form which extends between two or more corners, the corners at the ends of the corner stroke must be coded and the code is not "7".
(d) If the stroke form of the Chinese character "eight" crosses other stroke forms, the individual elements of the Chinese character "eight" are coded, and the code is not "8".
(e) Stroke forms which include two strokes at the center, or two strokes at one side are not designated by code "9".

Guide 3. In selecting stroke forms for corners:
(a) The rightmost and leftmost horizontal or singular stroke form should constitute the corner.
(b) If there are other stroke forms above or below the farthest right and/or the farthest left stroke form, such upper or lower stroke form should constitute the corner.

(c) When there are two selectable stroke forms at a corner, select the highest stroke form for the upper corners and the lowest stroke form for the lower corners.

(d) If there are other stroke form(s) below strokes that are right-bending or left-bending, the other stroke form or forms should be selected as the corners.

(e) If a right- or left-bending stroke is located in the upper left corner as the highest stroke, it should be selected as the left corner. However, if a right- or left-bending stroke is located in the upper right corner as the highest stroke, the rightmost extending stroke form will be used.

Guide 4. If two or more characters have the same four corner code, select the nearest and obvious stroke form above the lower right corner stroke form as a sub-corner and a fifth digit for the code. If that stroke form has been used, designate the code for the sub-corner as "0".

Guide 5. In the event that two characters have the same four corners and sub-corner code, index the character with an additional digit according to the number of actual horizontal strokes used to form the character.

Note: It is believed that the Four Corners Coding Method has not previously been described completely in any English language publication. The foregoing description is therefore intended to be definitive as to the method.

It should be noted that in the conventional Four Corner Coding System the radicals of the conventional Radical Coding Systems are not utilized as such in any way, that the code may contain four, five or six digits, and that, in case of redundancy in the five-digit code, it is the number of horizontal strokes only that is taken into consideration for the sixth digit.

The coding method of the invention, hereafter referred to as the GOO Coding System, refines and combines portions of the Radical Coding System and the Four Corner Coding System and expands the combined systems by additional steps in coding to have no ambiguities, i.e., to provide an exact and unique numerical code number for each character of a Chinese character-based language.

A careful study of the traditional table of 214 radicals revealed that a large number of these radicals were not in common to a sufficient number of characters to justify their being included as key-identifying radicals in a definitive numeric coding system. It was determined that less than 100 of the traditional radicals were in common to a sufficient number of characters to be required for an efficient, workable and definitive coding system.

A table of 97 radicals, coded under the GOO Coding System, but still arranged in their traditional sequence, is shown in Table II. The same radicals rearranged in the sequence of their code numbers under the GOO Coding System are shown in Table III together with the additional special non-radial code 00. The latter is shown at the bottom of Table II. It should be noted that preferably there are no code numbers 51 and 63 and that in TABLE III the 97 radicals are arranged in a 10×10 matrix in which space 51 and space 63 are left blank and spaces 98 and 99 are utilized.

It is apparent that the selection of 97 specific radicals is not definitive as to the GOO Coding System.

A different selection of a different number of radicals might be made without any basic change in the system. Likewise, the absence of code numbers 51 and 63 is a matter of choice as to a convenient manner of arranging the predetermined common elements from the traditional radicals.

The remaining traditional radicals, after withdrawal of the 97 used in the GOO Coding System, are treated as non-radicals, as described hereinafter, except for certain radicals shown in Table IV, which were found to be very much alike in appearance and meaning. It was determined that the radicals in each row under the heading "Traditional Radicals Incorporated" in Table IV could be grouped as a single radical in the GOO Coding System. The applicable single "incorporating" radical is shown to the left of the "incorporated" radicals in Table IV.

It will be noted in Table IV that five of the incorporated radicals have the same form as five individual characters. The five individual characters have been assigned to the non-radical group and given individual code numbers as shown in the footnote to Table IV.

If the character being translated contains a radical, as defined in Table III under the GOO Coding System, the two digits shown above the radical will form the first two digits of the numeric code. If the character being translated does not contain one of the radicals, shown in Table III, the first two digits of the numeric code are "00".

Although the selection of the 97 most common elements from the traditional radicals, with their sequence of numbering, as shown in Table III, is preferred, the arrangement of the elements in sequence is a matter of choice, and the scope of the invention includes any desired sequence of the selected traditional radicals. Likewise, the code for the predetermined common elements may be alphabetic or alphanumeric, instead of numeric, as long as it is computer readable.

Those knowledgeable with the Chinese language and the traditional radical coding system will readily be able to identify the radical portion of the character. The radical portion corresponds to the "root" portion of English words. For example, "-ology" as used in the words "technology", "biology", and "criminology" is derived from the Latin root meaning "study of".

Radicals are used in Chinese characters in a similar way. The radical " 艹 ", which is also written as " ψψ" (Goo code No. 44), means vegetation or plant and appears in the characters for "flower" ( 花 ) and "grass" ( 草 ). While the middle portion ( 日 ) of the "grass" character can also be a radical (Goo code No. 61), those familiar with Chinese characters would readily appreciate that in the example given it is not used as such. Tables VI and VIII give twelve additional examples of radical identification according to principles of radical coding.

The generic code for characters having no radical element may be selected as convenient instead of "00".

When any of the 97 predetermined elements of Table III in the preferred embodiment, is identified in coding, it is mentally removed from the character and the remaining parts of the character evaluated under the Four Corners Coding System in a manner described hereinafter. Likewise, any character not originally containing one of the predetermined elements as shown in Table III, will be evaluated under the same Four Corners Coding System, with a few specified exceptions.

For uniformity of length of code, five digits are used to identify the balance of the character, after the mental removal of the predetermined element, often referred to hereinafter as a radical, or to identify a non-radical character. If the sub-corner is required in the four Rules of the Four Corner Method to avoid redundancy, the stroke form of the sub-corner will constitute the fifth digit. If the sub-corner is not required to avoid redundancy, the fifth digit will be zero.

There are about 150 non-radical characters of the approximately 8,000 characters in a standard Chinese dictionary which do not lend themselves to the GOO Coding System. Examples of characters in this category are shown in Table V and have been assigned numbers as shown in this table. If a few additional characters in another Chinese character-based language, such as the Japanese or Korean languages are being encoded, which do not lend themselves to the GOO Coding System, it is apparent that they can be similarly handled.

Examples of coding under the GOO Coding System, wherein a radical under the invention is identified and mentally removed from the character and the Four Corners Coding System then applied, are shown in Table VI. The application of the Four Corner Coding System to the balance of the character after the recognition and mental removal of the GOO Coding System radical, will ordinarily result in a five-digit code, as described above. The five digits are added to the two digits representing the radical resulting in seven-digit code.

If the character does not include a radical, as defined in the GOO Coding System (Table III), the first two digits of the code number will be "00". The entire character will then be encoded under the Four Corner Coding System, resulting in a 7-digit code number as shown in Table VII.

It was discovered that, even after the application of the two steps of the GOO Coding System, resulting in a 7-digit code, a few ambiguities still remain wherein different characters receive the same 7-digit code number. These ambiguities have been specifically identified. It has been determined, where ambiguities are involved, that the total numbers of strokes in the balance of such characters after mental removal of the radical or in the entire character, if no radical under Table III exists, are never the same. These ambiguities are therefore resolved by adding an additional digit to the 7-digit numbers involved in the ambiguities based on such total number of strokes resulting in an 8-digit code number, as shown in Table VIII. If the number of counted strokes exceeds 9, only the units digit of the number of strokes is used. This resolves all the ambiguities arising out of the GOO Coding System.

Although steps have been taken, and will continue to be taken, by the responsible governments to reduce and to simplify the number of characters in Chinese-based languages, it is foreseen that, even under such simplified Chinese characters, the definitive code for each Chinese language-based character established by the GOO Coding Method will be appropriate and efficient. In summary, the GOO Coding Method includes the steps of
1. Determining the first two digits of the code by the predetermined element of Table III, or the absence of a predetermined element;
2. Determining the second five digits of the code by the four Rules and the first four Guides of the Four Corners Coding System; and
3. Determining the eighth digit of the code by counting the total number of strokes in the balance of the character after the mental removal of the predetermined element, or in the entire character, if no such predetermined element is present. If the total number of such strokes is 9 or less, the total number will be entered, but if the total number exceeds 9, only the units digit of the total number will be used as the eighth digit.

Anyone having minimum knowledge of a Chinese character-based language will have no difficulty in coding any character in the language under the system and rules defined herein. It is anticipated that in teaching and utilizing the GOO Coding System, however, a complete table of all characters and portions of characters converted to numeric codes under the GOO Coding System will be available.

EXAMPLE OF CODING PROCEDURE

The GOO Coding System converts the characters of Chinese character-based languages into a code which contains the 2-digit code of a radical, or "00", and five additional digits, with a few exceptions as described above. This is achieved by applying the GOO method of coding radicals in combination with the revised Four Corner Coding Method. To complete this process, one follows these two simple steps:
1. Locate the radical part of the Chinese character, i.e., one of the 97 predetermined elements, as included in Table III, if any.
2. Mentally remove the radical part, if any, of the character and form the five-digit code on the remaining part of the character, or on the entire character if there is no predetermined element present, by the Four Corner Coding Method in the manner described previously.

Consider the character  . The radical part of the word is  and the 2-digit code representing this radical, as shown in Table III, is 60. After removing the radical part of the word, the remaining part of the character is "  ". Applying the Four Corner Coding System to this remaining part results in the 5 digits "22010". Thus, the complete code for the character is 60-22010, as shown in the first line of Table VI.

Under the GOO Coding System, the identified radical, if any, is first mentally removed from the character being analyzed and then the Four Corner Method is applied, as stated above. This results not only in a great simplification of the application of the Four Corner Method, but also achieves greater accuracy in coding.

The GOO Coding System results in a unique code number for every Chinese character and the total of code numbers for all characters in a Chinese character-based language is completely compatible with the present state of the art for pictorial mass storage in memory.

Figure 3:
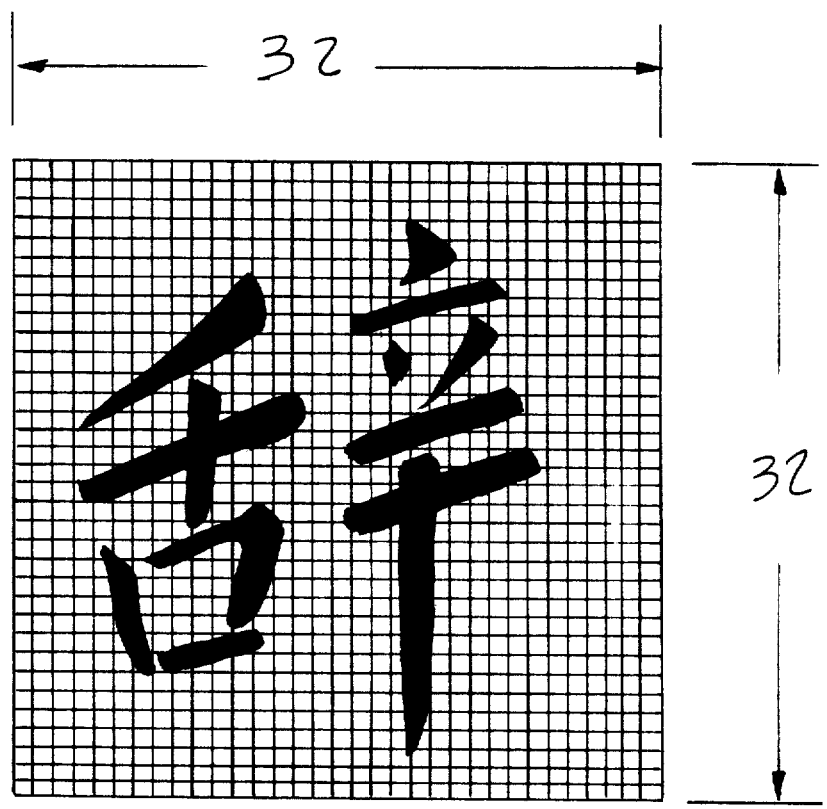
FIG. 3 is a representation of a complex Chinese character as pictorially stored in the mass storage memory of the character generator system of the invention.

In accordance with the invention, a complex character generator is provided comprising memory means for storing individual characters represented by a two-part code, the first part defining a predetermined element common to a plurality of characters, if any, or a unique two-part code if no such predetermined common element is present, and the second part defining the balance of the character. Preferably both parts of the code are numerical. As embodied herein, mass storage memory 12 (FIG. 1) of the character generator of the invention can be a flexible disk or a hard disk as commercially available from Winchester, Century Data Systems, Hewlett-Packard, and many other companies. Characters can be readily stored in pictorial form using 128 or more bytes per character which correspond to a picture of 32×32 dots or more as shown in FIG. 3. If higher quality resolution on a CRT display or a printer is desired, the character can be coded by 512 or even 1152 bytes, corresponding to 64×64 and 96×96, respectively, in the mass storage memory.

In the present state of the art of mass storage of data, it is economically feasible to store pictorially and access all of the characters of a Chinese character-based language. The complex character generator of the invention, with particular utilization for Chinese characters, can be used as a typewriter, a word processor, a telecommunication (telegraph) system, or input/output device to computer systems.

With the continuous advances in the technological area of minicomputer and microprocessor systems and their peripheral equipment, particularly the rapid, random accessible mass storage media such as the flexible disk and hard disk, the production and marketing of the complex character generator of the invention is made possible at a commercially reasonable cost. Since the cost of the mass storage is no longer a costly consideration, the need of compact coding of the character in the storage media is eliminated. In the present state of the art, each character can be stored as a picture in a 128 byte matrix (8 bits per byte) as shown in the example of FIG. 3.

In accordance with the invention, the complex character generator includes means for accessing the stored characters, the accessing means including means for entering into the character generator the first part of the numerical code and then for entering the second part of the numerical code. As embodied herein, and as shown in FIG. 1, the accessing means includes a unique compact keyboard 10 for accessing the mass storage memory 12 through a central processing unit 14. The entering means may include an individual key 22 for each of the 97 radicals utilized in the GOO Coding System as shown in the schematic represented in FIG. 2, for entering the first part of the numerical code, and numeric keys for entry of the balance of the 7- or 8-digit code, i.e., the second part of the individual code number. Preferably through the use of shift keys, more than one radical can be selectively encoded by the same radical key.

Figure 2:
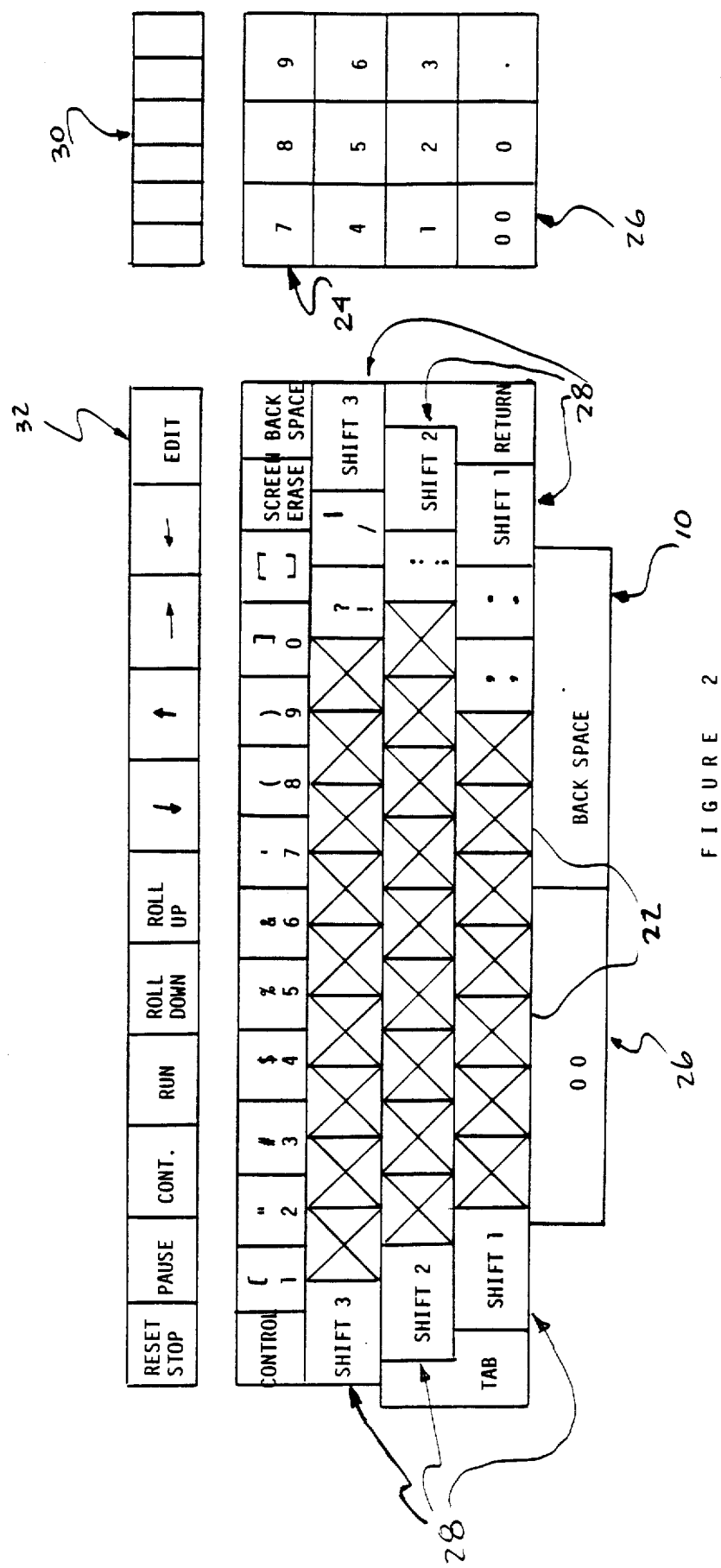
FIG. 2 is a schematic representation of the keyboard of the invention.
Figure 5:
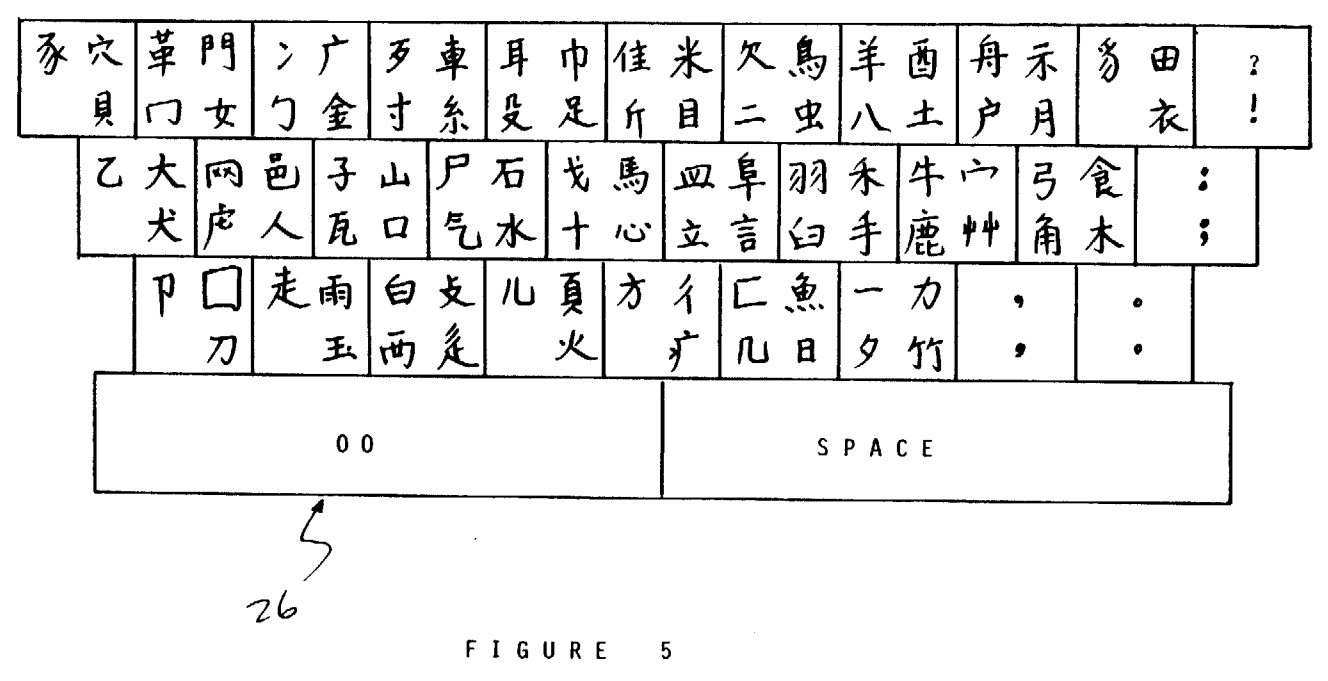

By utilizing the radical keys, the operator can enter the first two digits of the code, representing the radical, at a single stroke. In addition, a source of error of encoding, such as transposition of digits or the entry of entirely erroneous radical code digits is minimized. The numerical keys 24 preferably include a key 26 for "00" for entering at one stroke the first two digits of the non-radical group. The "00" may be included in the section of the keyboard incorporating the radical keys if desired. Each of the radical and numeric keys, when struck, will generate a binary code recognizable as an input part of the algorithm, to be described hereinafter. The form of keyboard, as shown in FIG. 2, is both schematic and symbolic. The number of radical keys, 22, for example, need not be the same as the number of predetermined elements of Table III, as stated above. By use of multiple position shift keys 28, the number of radical keys 22 may be reduced by using a single radical key, in combination with preassigned shift keys, to enter more than one predetermined element, i.e., radical. It is also advantageous to have such radical keys bear the representations of the predetermined common elements which can be entered by depression of the key, as shown in FIG. 5. The electronics for such multiple use of a single key are well-known in the keyboard art. For example, a single shift key, or a combination of two shift keys, may encode "no shift" by "00", "shift 1" by "01", "shift 2" by "10", and "shift 3" by "11". These shifts could represent respectively, for example, the upper left, upper right, lower left, and lower right positions of a radical key, so that a single radical key could encode any one of four radicals represented therein, as shown in FIG. 5. Many other structures can be utilized to encode selected one of two or more radicals by a single radical key.

The numerical keyboard section 24 may include a display area 30 for displaying the portion of the code entered by the numerical keys. It may be preferable not to display the "00" of the two-digit code section of the code in the display area 30.

As is well-known in the keyboard art, an "EDIT" key may be utilized to correct erroneous entries. Although not shown in FIG. 2, it is apparent that various signal lights may be incorporated in the keyboard 10 to inform the operator of the status of entries from the keyboard.

The keyboard 10 also includes standard keys such as punctuation, display control, roll up, roll down, left, right, erase, screen, reset, continue, pause, stop, etc., as known in the computer art.

It is, of course, recognized that the complete code under the GOO Coding System can be inputted into a computer by numerical keys alone.

By coordinating the coding system of the invention with the keyboard of the invention in the complex character generator, the seven or eight digit code of the invention can be quickly and efficiently inputted into a computer for recalling complete individual characters from memory. In addition, the keyboard of the invention is of compact and efficient size and organization.

The central processing unit 14 (CPU) controls the complex character generator and may be a minicomputer such as North Star, HP 9845, HP 9885, Mink or other minicomputers commercially available. The CPU 14 contains a computer program (algorithm) which controls the operations of the complex character generator. The capability of the generator depends on the algorithm stored in the CPU memory.

Figure 4:
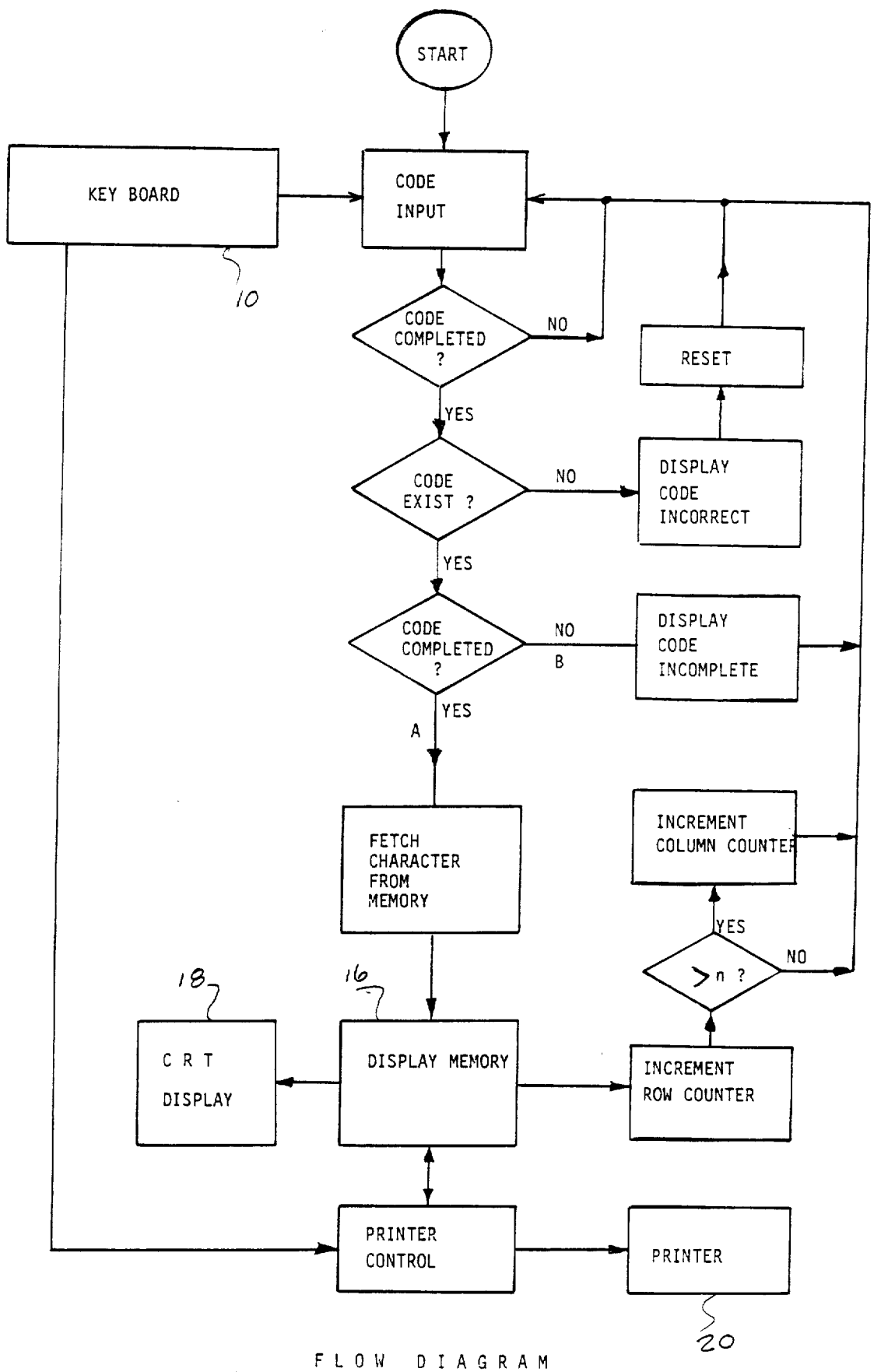
FIG. 4 is a flow diagram for use in the character generator system of the invention.

An algorithm including a flow diagram as shown in FIG. 4 provides the control for the character generator. As shown, the computer will take the input code from the keyboard (input terminal 10) and verify the existence and correctness of the code number. The number having been verified, the signals will continue through path A to fetch the corresponding character picture from mass memory 12 and place it at the proper location (determined by the row and column counters as known in the art) in the display memory 16, which character, in turn, will be displayed on the CRT 18. Having completed the process, the algorithm will increment the row and column counters and return to be ready to receive the next input character code. This will continue until the page is filled or a command stop has been indicated by the operator. Should the input code number be incomplete, the signal will enter path B and indicate to the operator the status (incorrect or incomplete) of the inputted code number. This will continue until a correct code is received and then will proceed along path A of the algorithm.

The basic system of the complex character generator also includes, as shown in FIG. 1, a display memory 16 responsive to the central processing unit, the display memory having read-out to a display CRT 18 and/or a printer 20. Alternatively, the central processor may read-out directly to the printer. It will be apparent to those skilled in the art that the central processing unit can read-out to a dot or ink-jet printer, a word processor, a telecommunication system, an input/output device to computer systems, and the like.

The basic system structure, except for the keyboard, is commercially available. Such a basic system, comprising a CPU, mass storage memory, display memory, CRT and printer, may utilize the North Star System by North Star Inc., the HP 9845 and HP 9885 computer systems by Hewlett-Packard Company, the PDP-11 systems by Digital Equipment Corp., and other systems by IBM, Texas Instruments, et al.

The CRT is basically a television monitor. It contains the electronics which scan the display memory 16 and display the information stored in the display memory.

Printer 20 may be a high resolution dot matrix printer commercially available from such companies as Texas Instruments (TI), Centronics, and others. Alternatively, the printer can be an ink-jet printer or a quality Xerox printer which can conceivably take the information from the display memory.

Display memory 16 can be located externally or internally to CPU. As diagrammed in FIG. 1, the display memory is depicted as an external unit of the CPU 14. The display memory 16 will contain a minimum of 512×512 dot storage elements to provide a sufficient resolution to the CRT display and, preferably, to a dot matrix printer. However, a 1024×1024 dot storage element can be used to provide higher quality for display and for the printer.

The apparatus, as described herein, is exemplary and it is apparent that those skilled in the art may make various modifications therein without departing from the scope of the invention, as defined in the ensuing claims.

What is claimed is:

1. A generator for generating Chinese character symbols comprising:

memory means for storing individual characters at memory locations represented by a two-part computer-readable code, the first part defining a predetermined radical element common to a plurality of characters, and the second part identifying the stroke forms contained at predetermined locations within the balance of the individual character;

means for fetching said stored characters from said memory means, said fetching means including means for entering into said character generator said two-part code and means for accessing the memory location within said memory means corresponding to said entered two-part code;

input means including a keyboard for controlling said means for fetching in response to manual key-in operations, said input means including means for causing entry of said first part of said two-part code in response to the operation of a key in a first section of said keyboard and means for causing entry of said second part of said two-part code in response to the operation of one or more keys in a second section of said keyboard, the keys in said first section being operated to select one of said predetermined elements common to a plurality of characters and the keys in said second section being operated to indicate the stroke-form content of the balance of a character, excluding said predetermined common element; and wherein said fetching means also includes means for entering a predetermined code in lieu of said first part, said predetermined code indicating the absence of any said predetermined radical element common to a plurality of characters.

2. The character generator of claim 1 wherein said keys of said second section of said keyboard are operated to indicate both the types and number of strokes contained in said balance of said character.

3. The character generator of claim 1 wherein said means for entering said predetermined code includes means responsive to the operation of a key in said second section of said keyboard.

4. The character generator of claim 3 wherein said first section of said keyboard includes keys for individually entering each one of said predetermined common characters, and wherein said second section of said keyboard includes mumerical keys 0–9 and wherein said means for entering said predetermined code is a key denoted "00".

5. The character generator of claim 4 wherein said keyboard includes multiple position means for coding at least two of the individual ones of said predetermined common characters by the depression of a single one of said keys of said first section of said keyboard.

6. The character generator of claim 5 wherein each of said keys of said first section pictorially identifies on its surface the predetermined element or elements coded by the depression of the individual key in conjunction with the utilization of said multiple position means.

7. The character generator of claim 7 wherein said multiple position means includes means for encoding any one of four of the individual ones of said predetermined common characters by the depression of a single one of said keys of said first section.

8. The character generator of claim 1 wherein said memory means stores said characters in pictorial form including at least 128 bytes per character.

9. The character generator of any one of claims 1, 2 and 3 through 8 also including means for displaying and means for printing any accessed character.

10. The character generator of claim 9 wherein said printing means is a high resolution dot matrix printer.

11. The character generator of claim 9 wherein said printing means is an ink-jet printer.

12. A character generator comprising:

memory means storing at predetermined memory locations symbol pattern data used in representing Chinese characters;

manually operable input means for generating an input code having a first subcode representing the radical portion of a Chinese character and a second subcode representing the number of stroke forms used in a portion of said character other than said radical portion and the type of stroke forms contained at predetermined locations of said portion of said character;

means for fetching symbol pattern data from said memory means at memory locations corresponding to said first and subcodes of said input code; and display means for displaying in the form of a Chinese character said symbol pattern data fetched from said memory means.

* * * * *